United States Patent
Menezes et al.

(10) Patent No.: US 10,430,383 B1
(45) Date of Patent: Oct. 1, 2019

(54) EFFICIENTLY ESTIMATING DATA COMPRESSION RATIO OF AD-HOC SET OF FILES IN PROTECTION STORAGE FILESYSTEM WITH STREAM SEGMENTATION AND DATA DEDUPLICATION

(71) Applicant: EMC IP Holding Company LLC, Hopkinton, MA (US)

(72) Inventors: Guilherme Menezes, Santa Clara, CA (US); Teng Xu, Mountain View, CA (US); Abdullah Reza, Santa Clara, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 514 days.

(21) Appl. No.: 14/870,942

(22) Filed: Sep. 30, 2015

(51) Int. Cl.
*G06F 16/174* (2019.01)
*G06F 16/17* (2019.01)

(52) U.S. Cl.
CPC ...... *G06F 16/1744* (2019.01); *G06F 16/1734* (2019.01)

(58) Field of Classification Search
CPC ......... G06F 17/30067; G06F 17/30595; G06F 17/30961; G06F 16/1744; G06F 16/1734
USPC ....................................................... 707/693
See application file for complete search history.

(56) References Cited

U.S. PATENT DOCUMENTS

| | | | |
|---|---|---|---|
| 8,612,696 B2 | 12/2013 | Zhu et al. | |
| 8,635,184 B2 | 1/2014 | Hsu et al. | |
| 8,650,163 B1 * | 2/2014 | Harnik | G06F 3/0605 707/692 |
| 9,026,752 B1 * | 5/2015 | Botelho | G06F 16/215 711/162 |
| 10,114,845 B2 * | 10/2018 | Botelho | G06F 16/215 |
| 2006/0104526 A1 * | 5/2006 | Gringeler | H04N 19/70 382/239 |
| 2013/0198148 A1 * | 8/2013 | Chambliss | G06F 17/30156 707/692 |
| 2013/0301890 A1 * | 11/2013 | Kaempfer | H04N 19/172 382/131 |
| 2014/0017407 A1 * | 1/2014 | Shimai | B05D 1/002 427/331 |
| 2017/0017407 A1 * | 1/2017 | Wei | G06F 3/0608 |

FOREIGN PATENT DOCUMENTS

WO WO2008008183 A3 1/2008

* cited by examiner

*Primary Examiner* — Michael Pham
(74) *Attorney, Agent, or Firm* — Workman Nydegger

(57) ABSTRACT

In one example, a method for processing data includes receiving information that identifies an ad hoc group of size 'n' of files $F_1 \ldots F_n$, each file F including a respective file sequence S that includes K data segments. Next, each file sequence S is sampled to obtain a sequence SS of data segments from the file sequence S, and a non-random sampling of data segments is sampled from each sequence SS to obtain a set SSU of the sequence SS. The data segments of each set SSU are then sampled to obtain a sample subset SSUS of the set SSU, and a compression ratio is determined for each data segment in each sample subset SSUS. Finally, an average data compression $R_{F1 \ldots Fn}$ is estimated and output for the files F in the group of size 'n', based on the compression ratios.

18 Claims, 5 Drawing Sheets

EFFICIENTLY ESTIMATING DATA COMPRESSION RATIO OF AD-HOC SET OF FILES IN PROTECTION STORAGE FILESYSTEM WITH STREAM SEGMENTATION AND DATA DEDUPLICATION

FIELD OF THE INVENTION

Embodiments of the present invention generally concern data backup and restoration. More particularly, at least some embodiments of the invention relate to systems, hardware, computer-readable media, and methods directed to estimating a data compression ratio.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace. Backup performance is crippled by the needs of up-to-date and online business applications.

In challenging environments such as these, resort has been made to techniques such as data compression in order to reduce the amount of storage space consumed by backup data. In connection with data compression processes, it is often useful to be able to determine a data compression ratio for a group of data sets, such as files for example. However, and discussed in more detail below, due to complexities in the environment in connection with which the compression is formed, problems can arise when attempts are made to determine data compression ratios.

In general, data compression refers to any process that can encode information in smaller amount of bits than the original representation, in effect reducing the amount of space a file uses on persistent storage. For example, the Lempel-Ziv (LZ) family of data compression methods may be used for lossless data compression in file systems. In the context of a file system with data deduplication and stream segmentation, each file will be split into a potentially very large number K of small segments of average size S. For example, a file F can be split into the following sequence of segments $F=(s1, s2, s3, \ldots, sK)$, and each segment may be compressed before it is stored. In this case, each file will have an average compression ratio R. For example, a compression ratio $R=0.5$ means that the segments will on average be reduced in size 50% before they are stored. In this case, the compressed average segment size C can be calculated as $C=S \times R$. Thus, if the average compression ratio $R=0.5$ and the average segment size is 8 KB, the compressed average segment size will be 4 KB.

In a file system with stream segmentation and data deduplication, where a write process is being performed, any segments of any file $Fi \in \{F1, F2, \ldots, FN\}$ can potentially deduplicate against any other segment inside the file system. In practice, this means that a segment may not be rewritten if it was already written to the system in the context of a different file. In order to get better data compression ratios, segments may not be compressed individually. In other words, a segment may be bundled up inside a sequence of segments that are compressed together as a data block. For example, in a Data Domain file system segments are stored inside variable-sized compression blocks that can have from one segment to a few hundreds of segments. The segments inside these blocks are compressed together in order to get better data compression ratios.

However, because of data deduplication, the segments for file F may be mixed up with the segments of any other file(s) in the system. The average data compression ratio will be dependent not only on the sequence of segments (s1, s2, s3, ..., sK) of F, but also on the specific way segments of F are mixed up with segments of other files in the system. Further, this mixture may change over time as segments are re-written by processes such as a garbage collector, data de-fragmentation processes or any other process that may move data in the underlying file system layers. Furthermore, a user may decide to use a different data compression method for a set of files, which will cause the data for these files to be re-compressed.

In practice this means that in a file system with data deduplication, the data compression ratio for a file can change over time depending on a variety of considerations. Such considerations may include the specific mixture of segments into compression blocks, the specific processes that are run in the background of the file system, and the specific order the files in the files systems are written.

In light of problems and shortcomings such as those noted above, it would be useful to be able to efficiently estimate an average data compression ratio R for an ad-hoc set of N files $\{F1, F2, \ldots, FN\}$ at a specific point in time T. As well, it would be useful to estimate an average compression ratio R for a set of N files in an environment where data stream segmentation and/or data deduplication are employed.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
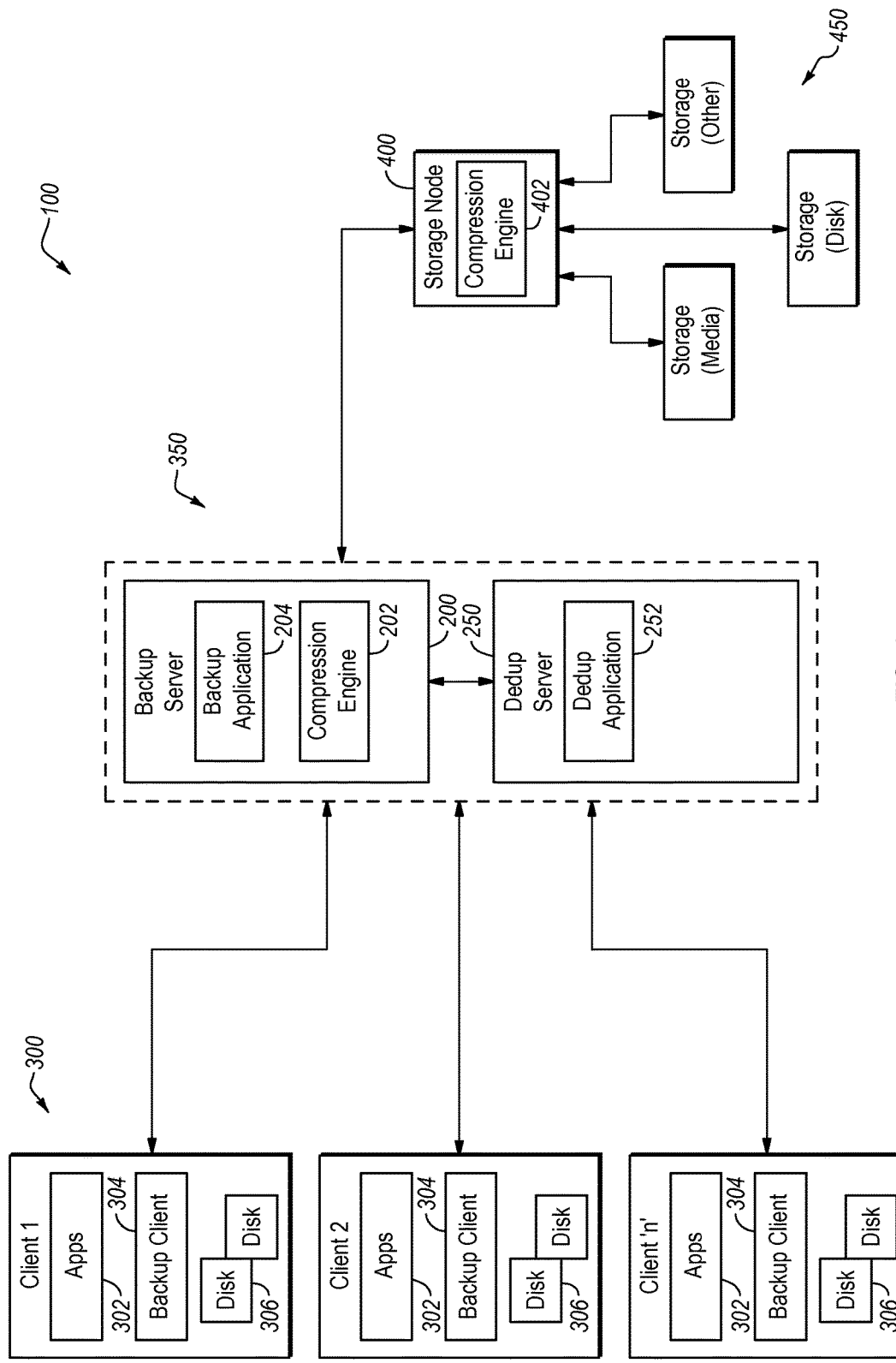
FIG. 1 discloses aspects of various example operating environments for at least some embodiments.

At least some embodiments of the invention relate to systems, hardware, computer-readable media, and methods directed to estimating a data compression ratio. Some particular embodiments determine an average data compression ratio R for an ad-hoc set of N files {F1, F2, . . . , FN} at a specific point in time T. The data compression ratio may be determined with respect to backup data, and/or any other data. As well, processes and methods for determining a data compression ratio can be performed in a variety of computing environments including, but not limited to, environments where data stream segmentation and/or data deduplication is/are performed.

With respect to the present disclosure, it should be understood that the term 'backup' as used herein is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some implementations, an average data compression ratio R is determined for a set of N files {F1, F2, . . . , FN}, and the average data compression ratio $R_F$ for a file F with K segments (s1, s2, s3, . . . , sK) is estimated by measuring the data compression ratio for a subset of sampled segments of F. In general, this approach employs segment-level sampling, a probabilistic segment caching method, and per file cached values.

The probabilistic segment caching method may be associated with a variety of preconditions or assumptions. For example, the method may require that the file system, in connection with which the data compression is employed, uses both data stream segmentation and data deduplication. As well, the method may require that the sampled segments be identifiable by content-based fingerprints, and that the segments are stored in compression blocks together with other segments. Finally, the method may require that the pre-compression size for a segment can be obtained, such as from the metadata for the file F. In more detail, when retrieving compression information for one segment from disk, compression information for other segments within the same compression block can be loaded into a lock-free, low memory overhead cache. This approach reduces the overall persistent storage operations and speeds up the process of estimating the desired compression ratio. The fingerprint caching mechanism employs a probabilistic algorithm to reduce the memory footprint while keeping the error rate low. This cache can also be lock-free, which ensures relatively fast inserts and look-ups.

As well, the probabilistic segment caching method may employ a variety of inputs. These inputs include the set of N files {F1, F2, . . . , FN}, a sampling ratio M for the sampled segments, and a uniform hash function for finger prints hash (f). The segment-level sampling is a non-random sampling process that targets segments based upon their content. Moreover, the set of sampled segments is a subset of unique segments of the sequence (s1, s2, s3, . . . , sK).

In operation, and given the aforementioned preconditions and inputs, the probabilistic segment caching method can generate an estimated data compression ratio $R_{\{F1, F2, \ldots, FN\}}$ for the set of N files {F1, F2, . . . , FN} at a particular point in time T. One specific example of a method for generating R is disclosed elsewhere herein.

The determination and use of the data compression ratio R may provide a variety of advantages. For example, embodiments of the invention can provide the ability to efficiently estimate data compression ratio for an ad-hoc set of N files in a file system with stream segmentation and data deduplication. As well, embodiments of the invention can provide the ability to estimate a data compression ratio for a set of N files at a specific point in time T. As another example, embodiments of the invention can provide the ability to store and reuse partial data structures so that the data compression ratio estimates can be re-built incrementally. Further, embodiments of the invention can provide a segment data compression caching method that has very compact memory utilization and very low memory overhead. Finally, embodiments of the invention can provide a segment data compression caching method that does not use locks and has very high efficiency.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data chunks, data blocks, atomic data, emails, objects of any type, files, contacts, directories, volumes, and any group of one or more of the foregoing. In at least some embodiments, the operating environment employs data stream segmentation and data deduplication processes.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with a deduplication server 250, one or more clients 300, and a storage node 400 that may comprise an element of a cloud computing environment. The deduplication server 250 and backup server 200 may collectively define a data protection environment 350 although, as noted herein, the data protection environment 350 can take other forms as well. In at least some embodiments, the data protection environment 350 reside at a different physical location than the clients 300, although that is not required. It should be noted that, more generally, the data protection environment refers to any environment in which one or more data protection processes are partly or completely performed and, as such, the scope of the invention is not limited to the example of FIG. 1. In some embodiments, the respective functionalities of the deduplication server 250 and backup server 200 may be combined in a single server. For example, the deduplication server 250 may be omitted and deduplication processes performed by, and/or at the direction of, the backup server 200. Finally, the storage node 400, which may be a cloud storage node, can communicate with, or include, various types of storage 450, and the storage node 400 may include or be associated with a data compression engine 402, discussed in more detail below.

With continued reference to FIG. 1, backups of one or more of the clients 300 can, in general, be made by cooperation between the backup server 200 and the client 300, and the backups can then be stored by the backup server 200 at the storage node 400. Subsequently, one or more of the stored backups can be restored to one or more of the clients 300 and/or any other target(s). The backup server 200, deduplication server 250, clients 300, storage node 400 and/or target(s) may be physical machines, virtual machines (VM), or any other suitable type of device. As well, some or all of the storage 450 can be implemented as physical or virtual devices. Finally, while not specifically illustrated, the storage node 400 can include one or more database servers that communicate with one or more data stores. The database servers can store metadata, such as pointers for example, that point to data stored in the data store(s).

In one alternative to the arrangement of FIG. 1, the storage node 400 can be replaced with, or constitute, a primary storage device that communicates with the backup server 200. The backup server 200 may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 204 that participates in the generation of backups. Example implementations of the backup application 204 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 204 of the backup server 200 to create one or more backups that include data that is resident on storage media 306, such as disks for example, of the client 300. The backups thus created can be communicated to the storage node 400 for storage and subsequent retrieval.

With continued reference to the example operating environment of FIG. 1, the data protection domain 350 may, as noted earlier, include a backup server 200 and deduplication server 250. In at least some embodiments, the data protection environment 350 is configured to communicate with a cloud storage environment which includes, or may consist of, the storage node 400. As such, deduplicated backups can be communicated by the data protection environment 350 to the storage node 400. The deduplicated backups can also be retrieved from the storage node 400 by the data protection environment 350 when there is a need to restore backup data to one or more targets, such as one or more of clients 300 for example.

In general, the deduplication server 250 includes a deduplication application 252 that performs deduplication services with respect to client 300 data that is to be backed up. The client 300 data that is to be deduplicated, which can take the form of one or more savesets for example, may be received by the deduplication server 250 from the backup server 200 although, as noted earlier, the deduplication server 250 can be omitted in some embodiments, in which case deduplication services are performed by the backup server 200. Creation of the backup and deduplication can be performed in any order. Thus, creation of the backup may be performed before, after, or at substantially the same time as, deduplication of the data that is to be backed up.

Once a deduplicated backup has been created, the backup application 204 can then communicate the deduplicated backup to the storage node 400. In one alternative embodiment, the backup may first be created by cooperation of the backup application 204 and backup clients 304 and, subsequently, deduplication can be performed on that backup. The deduplicated backup(s) can then be communicated to the storage node 400.

It should be noted that deduplication and compression can be performed in any order. For example, in some embodiments, the backup data is compressed before deduplication of that data is performed. Thus, and with reference to the example of FIG. 1, the backup data may first be compressed by a compression engine such as compression engine 202, and then the compressed data is deduplicated, such as by a deduplication application 252. In yet other embodiments, the backup data is deduplicated prior to compression. Thus, the backup data may first be deduplicated, such as by the deduplication application 252, and the deduplicated data then compressed, such as by the compression engine 202.

In some embodiments, the compression engine 402 at the storage node 400 compresses backup data received from the data protection environment 350 prior to writing of the received backup data to the storage 450. In these embodiments, the compression engine 402 may also determine an average compression ratio 'R' of data that is to be stored in storage 450 and/or may determine an average compression ratio 'R' of data that is already stored in storage 450. In yet other embodiments, data compression can be performed by a compression engine 202 of the backup server 200, and determination of average compression ratios 'R' is performed by the compression engine 402. As the foregoing non-limiting examples demonstrate, functionalities relating to data compression can be concentrated in a single entity, or dispersed amongst a plurality of entities. Accordingly, the scope of the invention should not be limited to any particular allocation of functions relating to data compression.

With continued reference to FIG. 1, a data compression ratio 'R' measurement can be obtained in a variety of ways. For example, a request for measurement of a data compression ratio 'R' can be made ad-hoc by a user using a command line or graphical user interface (GUI). Thus, such a request may originate at a client 300 or at a backup server 200. A request for measurement of a data compression ratio 'R' can additionally or alternatively be made automatically on a recurring basis, such as every day, week, month or any other time period.

B. Example Host Configuration

Figure 2:
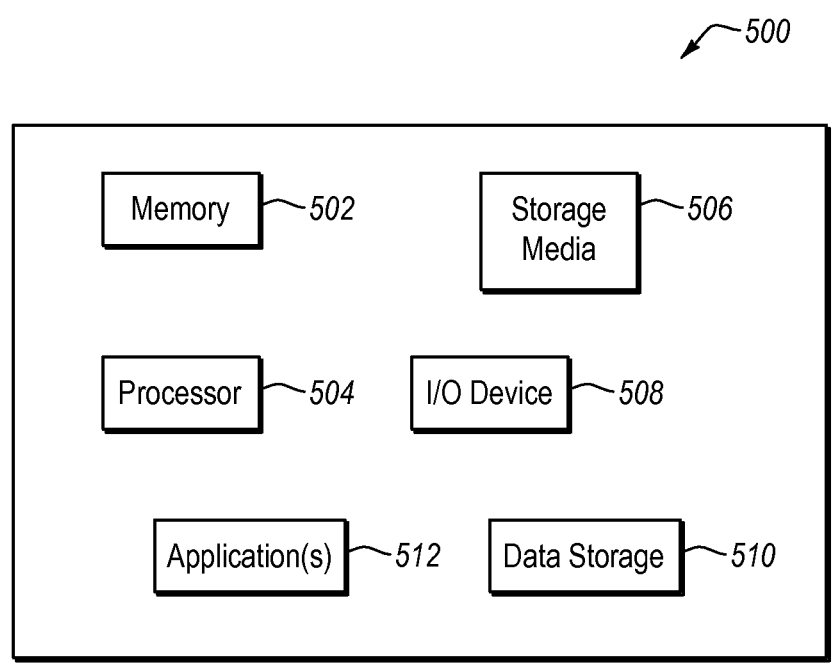
FIG. 2 discloses aspects of an example host configuration.

With reference briefly to FIG. 2, one or more of the backup server 200, deduplication server 250, clients 300, or storage node 400 can take the form of a physical computing device, one example of which is denoted at 500. In the example of FIG. 2, the physical computing device 500 includes a memory 502, one or more hardware processors 504, non-transitory storage media 506, I/O device 508, and data storage 510. As well, one or more applications 512 are provided that comprise executable instructions. Such executable instructions can take the form, for example, of one or more of a backup application, a backup client, a compression engine, or a deduplication application.

C. Aspects of Example Use Cases

In general, and as noted above, useful aspects of at least some embodiments of the invention are that an average compression ratio can be determined, or at least estimated, for any ad-hoc set of files. Another useful aspect is that the average compression ratio for the file set can be determined, or at least estimated, at any point in time. Moreover, such aspects can be achieved even in situations where an associated data stream is segmented, and subject to deduplication.

In particular, in a file system or other environment with data stream segmentation and data deduplication, it is a non-trivial task to measure the compression ratio for any set of ad-hoc N files since files deduplicate one against each other, and common segments are only written once. It is desirable to avoid double counting of shared segments during the data compression estimation. For example, if a segment that compresses very well is double-counted every time it is repeated, then the data compression for a file may be overestimated. As well, data compression changes with data as data is re-packed and moved by a garbage collector or other processes. Therefore, the measurement of data compression ratio that is performed at the time T when the data is written is unlikely to be an accurate representative of the real compression ratio at a future time T'.

The data compression ratio 'R' may be useful in a variety of contexts. For example, the data compression ratio 'R' can be used when there is a need for relatively high accuracy in the measurement of the data compression of a group of files. As another example, the data compression ratio 'R' may prove useful where there is a need to know a collective data compression ratio 'R' of a group of files, and not simply the compression ratio of a single files or an entire partition.

Moreover, the data compression ratio 'R' can be reported and/or otherwise used in a variety of use cases. For example, the data compression ratio 'R" can be reported to a user in multi-tenancy use cases in which the file system is shared among many users. Among other things, this information can enable a system and/or administrator to determine how much storage space is consumed by a particular user and, in turn, that user can then be charged based upon the amount of storage space consumed. As another example, the data compression ratio 'R' may be used to identify a subset of files that do not compress well and may need to be moved to a cheaper storage medium, or require compression by an alternative compression process that is more effective. Another example use for the data compression ratio 'R' concerns data storage capacity planning In particular, the data compression ratio 'R' may help to keep track of how much space a subset of files is using, since the amount of storage space consumed can change over time, due to factors such as data stream segmenting and data deduplication for example.

In terms of consumers of the data compression ratio information R, that information can be provided to any entity, or group of entities, as desired. Thus, in some embodiments, a backup application may use the data compression ratio information to generate reports concerning data storage consumed by one or more particular users, for example. As well, a backup administrator can use such reports in order to take decisions that will increase the space efficiency of an associated datacenter.

D. Example Methods for Obtaining Sample Data Set

Figure 3:
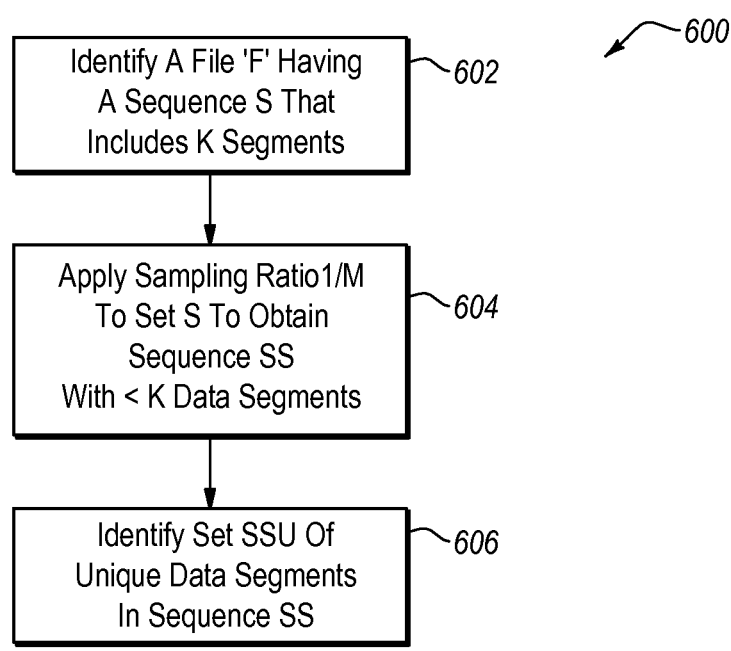
FIG. 3 is a flow diagram that discloses aspects of an example method for identifying, for a file F, a set $U_F$ of unique data segments that can be sampled for the purpose of determining a data compression ratio R.

With reference now to FIG. 3, details are provided concerning aspects of various methods according to embodiments of the invention. In general, these methods are concerned with obtaining a data set that can be used as a basis for determining, at any time T, an average compression ratio 'R' for an ad-hoc set of files or other groups of data.

As noted earlier, one example approach to efficiently estimate R for a set of N files {F1, F2, . . . , FN} is to use segment-level sampling, a probabilistic segment caching method, and per file cached values. In order to estimate the average data compression ratio RF for a file F with K segments (s1, s2, s3, . . . , sK), the data compression ratio for a subset of sampled segments of F can be measured.

Thus, the method 600 disclosed in FIG. 3 may begin by identifying 602 a file F having a data segment sequence S that includes K data segments. Because, as noted elsewhere herein, it is inefficient to calculate data compression for all K segments in the data sequence S, it is useful to reduce the number of data segments under consideration. This can be accomplished by sampling the data segment sequence S.

Accordingly, the method 600 advances and a sampling ratio 1/M is applied 604 to the data segment sequence S to obtain a sample of data segments for further consideration, namely, a sequence SS of the data segment set, where the sequence SS has <K data segments. Application of the sampling ratio of 1/M in this way means that only 1 segment out of each M segments inside the sequence S will be considered.

After the sample, that is, the sequence SS, is obtained, the method 600 then proceeds to identify 606 a set SSU of unique data segments in the sequence SS. As discussed in more detail in the discussion of FIG. 4 below, at least some embodiments of the process 606 can involve identifying, and removing, any segments that are repeated in SS. It should be noted that a set of unique data segments may also be referred to herein by the notation $U_F$.

It can thus be seen that to identify the set SSU, only K and a sampling ratio 1/M need be known. The particular number of unique segments (which can be denoted by L) of the sequence need not be directly calculated. Specifically, L can be derived, for example, by eliminating repetitive segments from the sequence. It should likewise be apparent that the segments selected for use in the calculation of the data compression ratio R, that is, the segments in the set SSU, are not randomly selected, but are, instead, selected based on the fact that they are unique within the sequence of interest.

With the foregoing discussion of FIG. 3 in view, reference is now made to a more particular example to further illustrate and clarify aspects of example methods within the scope of the invention. In this particular example, a given file F can include the following sequence: S=[s1, s2, s3, s1, s4, s1, s2, s5, s6]. In this case, K=|S|=9. Thus, K is the input of the method. The next task is to reduce the size of the working sequence S by sampling a subset of the segments in that working set. Among other things, this sampling approach reduces the size of the working set and thereby makes the method relatively cheaper in terms of memory and number of IOs to disk/persistent storage. If a sampling ratio of 1/M=2 is applied to the sequence S, the following sequence SS will result (if only the even segments are sampled): SS=[s2, s4, s2, s6]. Next, the unique segments of this set SS can be determined. In particular, any repeated segments (s2 in this example) are filtered out to produce the following subset of unique segments: SSU=[s2, s4, s6]. In at least some embodiments, and as discussed in more detail in connection with FIG. 4, SSU is obtained by using a bloom filter/bitmap to filter out any repeated entries, although any other suitable technique(s)/mechanism(s) could be employed instead of a bloom filter to implement or enable non-random selection of data segments. In any case, the second s2 occurrence will be filtered out in this example. Now, data compression can be measured for the unique segments that make up the set SSU. It should be noted that the following calculation of the data compression ratio R has been simplified for the purposes of this particular example. In fact, and as discussed in connection with FIG. 4, the sampling ratio 1/M can be applied to SSU so that only a subset of the unique data segments in SSU are considered in the data compression analysis, and this subset may be referred to herein as SSUS.

In particular, the pre-compression and post-compression sizes for s2, s4 and s6 can be accumulated thus:

pre-comp=pre_comp(*s*2)+pre_comp(*s*4)+pre_comp(*s*6)

post-comp=post_comp(*s*2)+post_comp(*s*4)+post_comp(*s*6)

Thus, the compression ratio R for the data segments of SSU will be:

R=pre-comp/post-comp.

A brief comparison may help to illustrate some advantageous aspects of the example method outlined above. In particular, if the sampling step noted above were omitted, an approximately 2× bigger bloom filter (2× more bits necessary) would be required to eliminate the repeated entries from the sample sequence SS. That is, the following 9 entries would have to be inserted into the bloom filter: S=[s1, s2, s3, s1, s4, s1, s2, s5, s6], rather than simply the 4 entries of SS=[s2, s4, s2, s6] as in the example noted above. Correspondingly, the output would be SU=[s1, s2, s3, s4, s5, s6], instead of SSU=[s2, s4, s6].

It should be noted that in this example, L=|SU|=6. However, and as noted above, if sampling is used, L is not explicitly calculated, nor is it required to be. Rather, the method is dealing with a subsample of SU (in this case SSU) which has size always <=L (in this case 3<=6). Finally, omission of the sampling step would require, in this example, approximately 2× more IOs to disk/persistent storage, since 1 IO per segment would have to be performed s in this set SU=[s1, s2, s3, s4, s5, s6], instead of in this set SSU=[s2, s4, s6].

E. Method for Identifying Set of Unique Data Segments

As noted at part 606 of the process 600 set forth in FIG. 3 discussed above, a set UF of unique data segments can be identified that can be used as a basis for determining an average data compression ratio R for an associated file F that includes the set UF. It is also noted that the accuracy of compression measurements is enhanced through the use of non-random sampling, namely, sampling based on the content of the segment, instead of sampling randomly, such as by using a rand( ) function. Thus, when the sampling is content based, segments can be consistently sampled without depending on the frequency of the segment in the dataset. In other words, data segments can be sampled from the sequence set SSU={u1, u2, u3, . . . , uL}, instead of from the entire sequence S (s1, s2, s3, . . . , sK) or from the sequence SS.

In connection with the foregoing, measurement of data compression for sample of a set of unique segments SSU takes into account the fact that, in a file system with data deduplication, each segment may be written to persistent storage only once. If the same segment is found again in the context of another file or in the context of the same file, that segment will not be re-written. Thus, data deduplication avoids the circumstance where some segments may be over-represented with higher frequency as compared to segments with a relatively lower frequency of occurrence. This is a desirable result, since data compression is to be estimated only for data that was actually written for the file F.

As discussed above in connection with FIG. 3, the example method 600 is generally concerned with determining the set SSU of unique data segments that are to be used as a basis for evaluating data compression of an associated file F. In at least some embodiments, this determination involves the use of a method that enumerates all the segment content-based fingerprints in order to decide whether the segment referred to by the fingerprint is to be considered for sampling or not. The fingerprints for the segments of a file F can be found in the metadata of the file F in an index, thus indicating which segment to read for a given offset inside file F. The enumeration of the fingerprints in the metadata for file F is usually much faster than the enumeration of the actual segments of file F. This means that a sampling method can be applied without actually reading the contents of the segments of F and, accordingly, an estimate of compression ratio 'R' can be made relatively more quickly. As well, because the same segment may be referenced several times inside the same file F, a measurement of its data compression ratio should be made only once. This can be done by using a bloom filter, or other probabilistic set implementation. The bloom filter may have one or more hash functions that map fingerprints into positions inside a bitmap B.

A fingerprint fp will only be measured if the bitmap B does not indicate the fingerprint was already measured. For example, if a bloom filter with only one hash function is utilized, the process can be as follows:

if (B[hash(fp)]==0) {
measure(fp);
B[hash(fp)]=1;
}

It should be noted that bloom filters may have false positives because of hash function conflicts inside B. This means, for example, that a segment s1 (with fingerprint fp1) may collide with a segment s2 (with fingerprint fp2), in which case only one of them will be measured. This will cause a compression ratio measurement error. However, this problem can be attenuated, or eliminated, by making B a sparse bitmap in a very large range such that range(B)>>L/M. This is feasible if M is made a very large number. These can be tuned in order to find a sufficiently low error rate.

A fingerprint caching mechanism can also be implemented that can be used to avoid an excessive number of index lookups and metadata reads, both of which will issue expensive read operations to persistent storage. This fingerprint caching mechanism is lock-free, has very low memory footprint and is probabilistic in the sense that there is a very low probability the data compression ratio for a wrong fingerprint will be returned. In at least some embodiments, this cache is simply an array of 64 bit entries. The first 'b' bit entries are used to store the key ki that identifies a fingerprint fpi, such that:

ki=hash(*fpi*)

The last (64-b) bits of the entry have the data compression ratio as measured from persistent storage. This ratio is encoded in (64-b) bits so that $2^{(64-b)}$ represents the higher bound for data compression ratio. In other words, if the maximum data compression ratio supportable in the file system is R=0.1 and if b=48, then $2^{16}$ represents 1/R=10, and any ratio R>0.1 can be encoded with a linear transformation in the range (0, $2^{16}$–1). With 'b' bit keys, there is a probability of collision of 1 in $2^b$. This will map to a very small error ratio if 'b' is large enough.

In terms of memory overhead, the cache eviction policy is to atomically overwrite the 64 bit entry in the case of a collision. This approach will ensure very small memory overhead for the cache implementation. This policy can be an approximation of a Least Recently Used (LRU) cache.

Embodiments of the invention also take advantage of the fact that there may be a high probability that fingerprints belonging to the same file F are co-located inside the same compression blocks (i.e. spatial locality). For example, every time a block is touched in order to get a data compression ratio measurement for a fingerprint fp, not only is the fingerprint fp loaded into memory, but all the other fingerprints inside the same compression block are also loaded into memory. In practice, this means that thousands or more fingerprints may be loaded in one single read operation from persistent storage.

Figure 4:
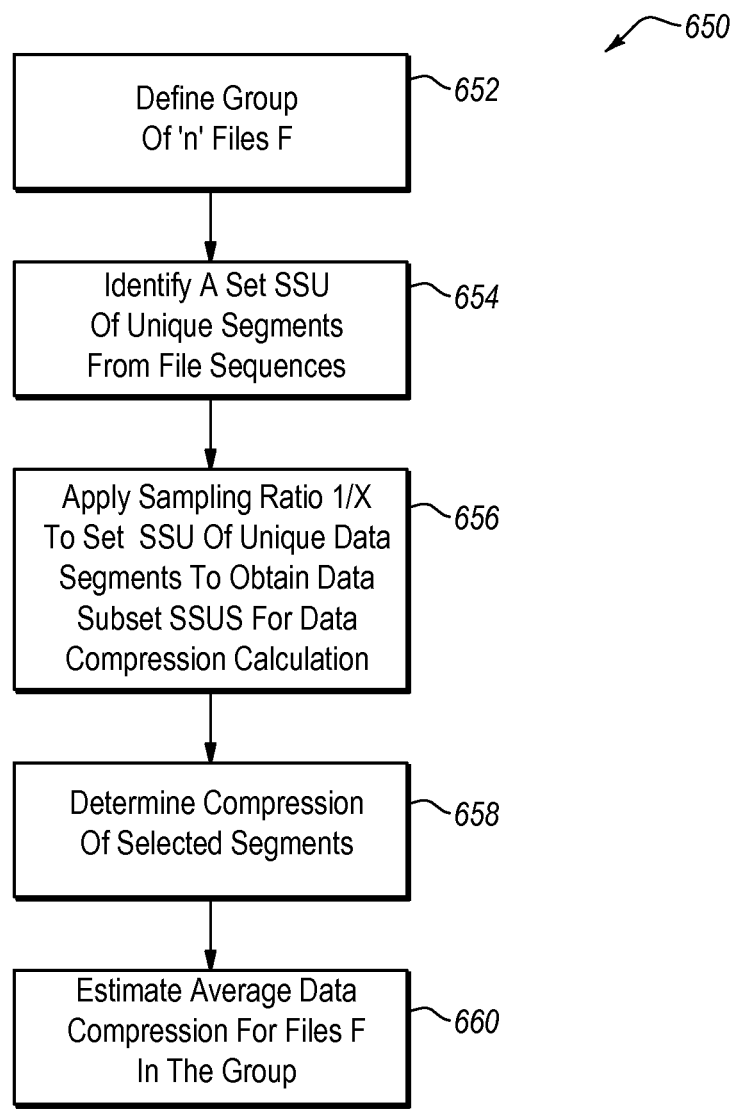
FIG. 4 is a flow diagram that discloses aspects of an example method for using a set $U_F$ of unique data segments to determine a data compression ratio R for a file F.

With particular reference now to FIG. 4, a method 650 may be used to determine an average data compression R for a file F that includes a set SSU of unique data segments, where the set SSU can be determined by methods such as that set forth in FIG. 3. In general terms, the method 650 can be performed for each file F in a group of files $F_1 \ldots F_n$. As well, the method 650 can be performed serially for each of the files F in the group, or multiple respective instances of the method 650 can be performed at the same time for each of the files F in the group. As noted herein, the grouping of files selected can be an ad hoc grouping, and one or more instances of the method 650 can be performed at any time, or times, T.

Initially, a group of 'n' files F can be selected ad hoc 652. The files F can be any type or size of file, and the selection of the files F can be made at any time T. The selection 652 can be made, for example, by a user by way of a command line interface, GUI, or other type of interface. The user can be an administrator, and the selection 652 can be specified, for example, at a backup server, a storage server, or any other entity in the computing environment. After the file group has been specified 652, the remaining processes of the method 650 can be performed for each file F in the grouping $F_1 \ldots F_n$. It should be understood that the remaining processes in the method 650 can be performed at any time T after file selection 652, whether immediately, or at another time. Finally, the method 650 can be performed in conjunction with the method 600, discussed above in connection with FIG. 3.

With continued attention to FIG. 4, a set SSU of unique segments for the file F is identified 654. This identification can be made on any suitable basis. In at least some embodiments, the identification of the set SSU of unique segments is made based on the content of the segments, such as by way of the method 600 addressed in FIG. 3 and the associated discussion. Once the set SSU of unique segments is identified 654 for a sequence of a file F, the set SSU can then be sampled 656. In at least some embodiments, the sampling 656 of the set SSU can be performed by applying a sampling ratio 1/X to SSU obtain a subset SSUS of unique data segments that can be used for determination of an average data compression R. With respect to the sampling ratio 1/X, that sampling ratio can be different from the sampling ratio that was applied to the set S of data segments, although that is not required and in some implementations, the sampling ratio used at 604 of FIG. 3 is the same as the sampling ratio used at 656 of FIG. 4.

Thus, the same sampling ratio 1/X can be applied to the data segments of the file F twice, namely, to the initially identified data segment sequence (FIG. 3—reference 604), and to the set SSU (FIG. 4—reference 656) that is subsequently obtained from that data segment sequence, or different respective sampling ratios can be applied in processes 604 and 656. As noted elsewhere herein, this dual sampling process can contribute significantly to the speed, efficiency and effectiveness of the disclosed processes, since it reduces the number of data segments that will be taken into consideration when determining R.

After the size and content of the sample have been determined, the selected segments can be examined and their compression determined 658. In at least some embodiments, this process is performed on a per-segment basis. In other embodiments, the compression of a group of segments, such as a group of segments in a compression block, can be determined.

In any event, once the compression of the selected segments from the subset SSUS has been determined, the average data compression ratio RF can be determined 660 for the file(s) in the group $F_1 \ldots F_n$. As noted earlier, RF for a single file F can be expressed as a ratio of the file F size pre and post compression, thus:

$$R_F = \text{post\_size}(F)/\text{pre\_size}(F)$$

and a compression ration $R_{(F \ldots Fn)}$ for a group of files, thus:

$$R_{\{F1, F2, \ldots, FN\}} = \text{post\_size\_all}/\text{pre\_size\_all}$$

Once the data compression ratio RF is calculated for a file F, RF will only be re-calculated in the future if the file F has changed. Both the pre-compressed (and post deduplication) size of the file pre_size(F) and the post-compressed (and post deduplication) size of the file post_size(F) are stored. It should be noted that if size(F) is the logical size of the file as seen by an external user of the file system, then:

$$\text{size}(F) >= \text{pre\_size}(F) >= \text{post\_size}(F).$$

Also, note that $R_F = \text{post\_size}(F)/\text{pre\_size}(F)$.
Further:
for a set of N files {F1, F2, . . . , FN}, post_size(Fi) and pre_size(Fi) for 1<=i<=N are summed thus:

$$\text{post\_size}(\{F1, F2, \ldots, FN\}) = \text{post\_size}(F1) + \text{post\_size}(F2) + \ldots + \text{post\_size}(FN)$$

and $$\text{pre\_size}(\{F1, F2, \ldots, FN\}) = \text{pre\_size}(F1) + \text{pre\_size}(F2) + \ldots + \text{pre\_size}(FN).$$

Finally, $R_{\{F1, F2, \ldots, FN\}}$ can be estimated as:

$$\text{post\_size}(\{F1, F2, \ldots, FN\})/\text{pre\_size}(\{F1, F2, \ldots, FN\}).$$

As indicated in the foregoing discussion of FIG. 4, and elsewhere herein, the methods disclosed herein for determination of an average data compression for a group of files may be advantageous in a variety of regards. For example, the data compression determination can be made in environments where data deduplication and/or data stream segmentation are performed. As well, the data compression determination can be performed notwithstanding ongoing changes to, or at least relating to, the involved files. For example, file segments may be moved on bottom layers of DDFS, and/or and local compression rates for a file may change. Also, a user may also change the compression process which will invalidate any local compression measurements collected during ingest. Nonetheless, embodiments of the invention are able to generate data compression ratios notwithstanding the occurrence of such events. As well, embodiments of the invention are able to measure the local compression for an entire file, even if most, or all, of the file comprises deduplicated segments.

Finally, one example of an process that can be used for generating, as an output, an average data compression ratio $R_{\{F1, F2, \ldots, FN\}}$ is set forth below. Of course, any other routine, process, program, or method that is effective in determining R in view of the variables and constraints noted herein can alternatively be employed. Thus, the scope of the invention is not limited to the example set forth below. The preconditions and inputs for the example process are discussed above in detail.

Parts of Example Process:
1. Initialize post_size_all=0 and pre_size_all=0
2. Initialize fingerprint cache C
3. For each file F in {F1, F2, . . . , FN}
4. If measurement for F is pre-computed and stored
5. Fetch post_size(F) and pre_size(F)
6. post_size_all+=post_size(F)
7. pre_size_all+=pre_size(F)
8. Else if measurement for F is still not pre-computed or stored
9. Initialize bitmap $B_F$
10. For each fingerprint f found in file F
11. If f is selected/sampled with sampling rate 1/M
12. If $B_F$[hash(f)]==0
13. $B_F$[hash(f)]=1
14. If fingerprint f is found in cache C
15. Load data compression ratio $R_f$ from cache C
16. Else
17. Read data compression ratio $R_f$ for f from persistent storage
18. Store $R_f$ for fingerprint f in cache C
19. For each fingerprint fi found in the same compression block as f
20. Store $R_{fi}$ for fingerprint fi in cache C
21. pre_size(F)+=pre_size(f)×M
22. post_size(F)+=pre_size(f)×$R_f$×M
23. post_size_all+=post_size(F)
24. pre_size_all+=pre_size(F)
25. $R_{\{F1, F2, \ldots, FN\}}$=post_size_all/pre_size_all With reference finally to FIG. 5, and in view of the disclosure herein, it will be appreciated that processes and methods such as those addressed in FIGS. 3 and 4 can form elements of a more comprehensive process, one example of which is denoted at 700 in FIG. 5. It should be noted that while various functionalities are attributed to certain entities in FIG. 5, the scope of the invention is not limited to the example allocation of that figure. More generally, the functions disclosed in FIG. 5, and all of the functions disclosed herein, can be allocated amongst the disclosed entities in any manner. Accordingly, the arrangement in FIG. 5 is presented solely by way of example.

Figure 5:
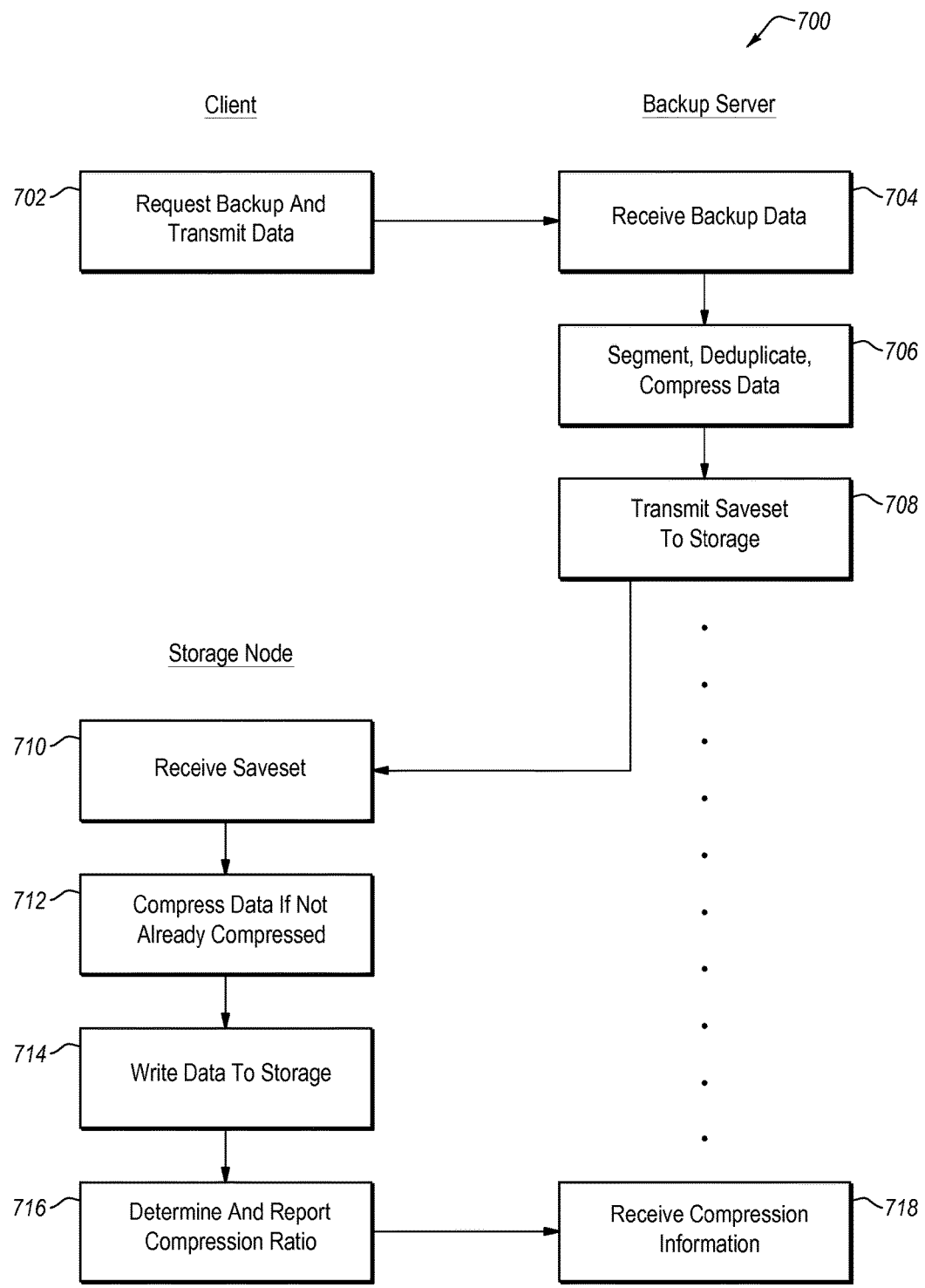
FIG. 5 is a flow diagram that discloses aspects of an example method for processing data, including a data compression process.

In the example of FIG. 5, the method 700 can begin when a user at a client requests 702 that a backup of client data be performed. The request can be sent by a backup client to a backup application at a backup server. In this example, the backup server receives 704 the backup request and a copy of the data that is to be backed up. The backup server can then segment, deduplicate, and compress 706 the data that is to be backed up. The deduplication can be performed inline, that is, by the backup server while creating the backup or, alternatively, deduplication may be performed after the backup has been written to storage. As well, data compression can be performed by the backup server, or at a storage node, as discussed below.

After the backup has been created, the saveset is transmitted by the backup server to storage 708. As noted earlier, the storage 708 can be cloud storage, although that is not necessarily required. The saveset is received 710 at the storage node and, if the data has not already been compressed, the segmented and deduplicated data of the saveset is compressed 712 at the storage node, and the compressed data then written 714 to storage. The stored data can then be evaluated and a compression ratio determined 716 for some or all of the stored data. In other embodiments, the compression ratio is determined after compression, but prior to storage. After the compression ratio has been determined, a corresponding report can be generated and sent, by the storage node in some embodiments, to the backup server.

The backup server receives the report 718 and can then use the compression information in the report to inform various processes and analyses, as disclosed elsewhere herein. In addition to the backup server, the report can be distributed to other entities as well, such as, for example, one or more clients. Among other things, the backup application may use the data compression ratio information to generate reports concerning data storage consumed by one or more particular users, for example. As well, a backup administrator can implement actions to increase the space efficiency of an associated datacenter, based on the compression information in the reports.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a saveset at a storage node, the saveset comprising data that has been segmented and deduplicated;
improving data storage efficiency by compressing the segmented and deduplicated data, when the segmented and deduplicated data has not already been compressed;
writing the compressed data to storage;
receiving, from a user, a selection that identifies an ad hoc group of size 'n' of files $F_1 \ldots F_n$ that are included in the stored data, each file F including a respective file sequence S that includes K data segments;
sampling each file sequence S to obtain a sequence SS of data segments from the file sequence S;
performing a non-random sampling of data segments from each sequence SS to obtain a set SSU of the sequence SS;
sampling the data segments of each set SSU to obtain a sample subset SSUS of the set SSU, wherein sampling the data segments of each set SSU and sampling the file sequences S reduces a number of Input/Output (IO) operations to disk/persistent storage that would otherwise be required by the method;
determining a compression ratio for each data segment in each sample subset SSUS;
estimating and outputting an average data compression $R_{F1} \ldots F_n$ for the files F in the group of size 'n', based on the compression ratios; and
using the average data compression $R_{F1} \ldots F_n$ to determine how much storage space is occupied by the files F.

2. The method as recited in claim 1, wherein the non-random sampling of data segments from each sequence SS is based on the content of the sampled data segments.

3. The method as recited in claim 1, wherein estimation of average data compression $R_{F1} \ldots F_n$ for the files F in the group of size 'n' is performed at any time T.

4. The method as recited in claim 1, wherein one or more of the files F includes deduplicated data.

5. The method as recited in claim 1, further comprising using the average data compression $R_{F1} \ldots F_n$ information as a basis to take one or more actions to be taken regarding data storage space in a datacenter, and wherein the actions to be taken regarding data storage space in the datacenter comprise changing a storage space efficiency of the datacenter.

6. The method as recited in claim 1, wherein no data compression measurement has previously been performed respecting the sampled data segments S.

7. The method as recited in claim 1, further comprising:
when retrieving compression information for one data segment from disk, the one data segment being included in a compression block, loading compression information for one or more other data segments within the same compression block into a lock-free, low memory overhead cache.

8. The method as recited in claim 1, wherein a number of data segments sampled from each of the segment sets SSU is determined by applying a sampling ratio 1/M to each segment set SSU.

9. The method as recited in claim 1, wherein performing a non-random sampling of data segments from each sequence SS to obtain a set SSU of sequence SS comprises identifying a set of unique data segments in the sequence SS.

10. A method for processing data, comprising:
deduplicating data segments of a saveset;
compressing data segments of the deduplicated saveset;
writing, or causing the writing of, the deduplicated and compressed saveset data segments to storage; and
performing, or causing the performance of, the following:
defining ad hoc a group of size 'n' of files $F_1 \ldots F_n$, one or more of which is included in the saveset; and
estimating an average data compression $R_{F1} \ldots F_n$ for the files F in the group of size 'n', wherein some data of one or more of the files F in the saveset is undeduplicated data.

11. The method as recited in claim 10, further comprising:
for each file F, identifying a sequence SS of data segments from a corresponding file sequence $S_1 \ldots S_K$;
performing a non-random sampling of data segments from each sequence SS to obtain a set SSU of the sequence SS;
sampling the data segments of each set SSU to obtain a sample subset SSUS of the set SSU;
determining a compression ratio for each data segment in each sample subset SSUS; and estimating and outputting an average data compression $R_{F1} \ldots F_n$ for the files F in the group of size 'n', based on the compression ratios.

12. The method as recited in claim 11, wherein a number of data segments sampled from each of the segment sets SSU is determined by applying a sampling ratio 1/M to each segment set SSU.

13. The method as recited in claim 10, further comprising reporting the average data compression $R_{F1} \ldots F_n$.

14. The method as recited in claim 10, further comprising taking any one or more of the following actions, using the average data compression $R_{F1} \ldots F_n$ information:
   changing a storage space efficiency of a datacenter;
   identifying one or more files for movement to a different storage medium that is relatively less expensive than a storage medium in which the one or more files are then stored; or
   identifying one or more files whose compression may be improved by an alternative to the compression method that was previously employed on the one or more files.

15. A non-transitory storage medium having stored therein computer-executable instructions which, when executed by one or more hardware processors, processes data by performing the following processes:
   receiving a saveset at a storage node, the saveset comprising data that has been segmented and deduplicated;
   improving data storage efficiency by compressing the segmented and deduplicated data, when the segmented and deduplicated data has not already been compressed;
   writing the compressed data to storage;
   receiving, from a user, a selection that identifies an ad hoc group of size 'n' of files $F_1 \ldots F_n$ that are included in the stored data, each file F including a respective file sequence S that includes K data segments;
   sampling each file sequence S to obtain a sequence SS of data segments from the file sequence S;
   performing a non-random sampling of data segments from each sequence SS to obtain a set SSU of the sequence SS;
   sampling the data segments of each set SSU to obtain a sample subset SSUS of the set SSU, wherein sampling the data segments of each set SSU and sampling the file sequences S reduces a number of Input/Output (IO) operations to disk/persistent storage that would otherwise be required by performance of the processes;
   determining a compression ratio for each data segment in each sample subset SSUS;
   estimating and outputting an average data compression $R_{F1} \ldots F_n$ for the files F in the group of size 'n', based on the compression ratios; and
   using the average data compression $R_{F1} \ldots F_n$ to determine how much storage space is occupied by the files F.

16. The non-transitory storage medium of claim 15, wherein the non-random sampling of data segments from each sequence SS is based on the content of the sampled data segments.

17. The non-transitory storage medium of claim 15, wherein estimation of average data compression $R_{F1} \ldots F_n$ for the files F in the group of size 'n' is performed at any time T.

18. The non-transitory storage medium of claim 15, wherein one or more of the files F includes deduplicated data.

* * * * *

UNITED STATES PATENT AND TRADEMARK OFFICE
CERTIFICATE OF CORRECTION

PATENT NO. : 10,430,383 B1
APPLICATION NO. : 14/870942
DATED : October 1, 2019
INVENTOR(S) : Menezes et al.

Page 1 of 1

It is certified that error appears in the above-identified patent and that said Letters Patent is hereby corrected as shown below:

In the Claims

Column 17
Line 23, Claim 15: change "processes" to —process—

Signed and Sealed this
Seventh Day of January, 2020

Andrei Iancu
*Director of the United States Patent and Trademark Office*